United States Patent
Sandoval et al.

(10) Patent No.: US 8,479,678 B1
(45) Date of Patent: Jul. 9, 2013

(54) BIRD REPELLING APPARATUS

(76) Inventors: Dorie Sandoval, Long Beach, CA (US);
Potenciano H. Sandoval, Long Beach, CA (US)

(*) Notice: Subject to any disclaimer, the term of this patent is extended or adjusted under 35 U.S.C. 154(b) by 498 days.

(21) Appl. No.: 12/875,300

(22) Filed: Sep. 3, 2010

Related U.S. Application Data

(63) Continuation-in-part of application No. 12/122,155, filed on May 16, 2008, now abandoned.

(51) Int. Cl.
*A01M 29/00* (2011.01)
*A01M 29/06* (2011.01)
*A01M 29/08* (2011.01)

(52) U.S. Cl.
USPC ............ 116/22 R; 116/22 A; 40/477; 43/124; D11/141; D21/467

(58) Field of Classification Search
USPC .............. 116/22 R, 22 A; 40/477–479; 43/2, 43/124; 84/402; D11/141; D21/467
See application file for complete search history.

(56) References Cited

U.S. PATENT DOCUMENTS

| | | | | |
|---|---|---|---|---|
| 1,066,045 A | * | 7/1913 | Pass | 116/22 A |
| 1,167,502 A | * | 1/1916 | Huffman et al. | 116/22 A |
| 1,286,380 A | * | 12/1918 | Matthews | 40/422 |
| 1,287,968 A | * | 12/1918 | Greenleaf | 116/2 |
| 1,886,784 A | * | 11/1932 | Boppenhausen | 59/83 |
| 1,981,696 A | * | 11/1934 | Harper | 59/80 |
| 2,575,252 A | * | 11/1951 | Berger | 40/417 |
| 2,722,195 A | * | 11/1955 | Rockafeller | 116/22 A |
| 3,085,545 A | * | 4/1963 | Ore | 116/22 A |
| 3,487,569 A | * | 1/1970 | Mendall | 40/412 |
| 3,856,609 A | * | 12/1974 | Maas | 428/11 |

(Continued)

FOREIGN PATENT DOCUMENTS

| | | | |
|---|---|---|---|
| JP | 64-016545 | * | 1/1989 |
| JP | 2001-299184 | * | 10/2001 |
| JP | 2003-250423 | * | 9/2003 |

OTHER PUBLICATIONS

"Scarecrows that actually work by Nathan Griffith from the Jul./Aug. 2002 issue of Countryside & Small Stock Journal" (http://www.countrysidemag.com/issues/86/86-4/Nathan_Griffith.html), pp. 1-4, Jul. 2002.*

(Continued)

*Primary Examiner* — Randy W Gibson

(57) ABSTRACT

A bird repelling apparatus to repel birds from plants including a hanger, a round eyelet on a hanger second end, an initial ring loosely attached thereto, a thin diameter greater than 3 inches and 2 gauge thick first disc with a 0.2 inch diameter top aperture attached to the initial ring and a bottom aperture to which a round 0.75 inch diameter first memory wire ring is loosely engaged, and a 0.4 inch diameter jump ring loosely engaging the first memory wire ring. A second memory wire ring loosely engages the jump ring and a 0.2 inch diameter second disc upper aperture and has a 0.2 inch diameter lower aperture. The dimensions and the high gloss finish of the stainless steel discs are critical to the bird repelling function. Loose connectivity between the jump and memory wire rings and the discs provides liberal, relatively independent and unimpeded disc movement in a slight breeze.

4 Claims, 5 Drawing Sheets

U.S. PATENT DOCUMENTS

| | | | | |
|---|---|---|---|---|
| 4,131,079 | A | * | 12/1978 | Rousseau et al. ............ 116/22 A |
| D261,489 | S | | 10/1981 | DuBois |
| 4,404,778 | A | | 9/1983 | Ushimaru |
| 4,448,017 | A | * | 5/1984 | Stark ................. 59/80 |
| 4,597,357 | A | * | 7/1986 | LeMessurier ............... 116/22 A |
| 4,757,425 | A | * | 7/1988 | Waltz .............................. 362/18 |
| 4,986,067 | A | * | 1/1991 | Caccialupi ........................... 59/3 |
| D382,088 | S | * | 8/1997 | Harp ............................. D2/633 |
| 5,702,781 | A | * | 12/1997 | Barker ............................ 428/16 |
| 5,901,491 | A | * | 5/1999 | Caldwell ............................ 43/1 |
| 6,178,673 | B1 | | 1/2001 | Blackford et al. |
| 6,786,032 | B2 | * | 9/2004 | Chia et al. ...................... 59/35.1 |
| 6,807,765 | B2 | | 10/2004 | Watermann |
| 7,255,060 | B2 | * | 8/2007 | Grandy ....................... 116/22 A |
| D566,000 | S | * | 4/2008 | Chan ........................... D11/141 |
| 2003/0047059 | A1 | * | 3/2003 | Brown, Jr. ...................... 84/402 |

OTHER PUBLICATIONS

"Memory Wire—Artbeads.com" @ (http://www.artbeads.com/stringing-materials-memory-wire.html), pp. 1-2, Mar. 2013.*

"Memory Wire & End Caps from abeadstore.com" @ (http://www.abeadstore.com/stringing_memory_wire), pp. 1-2, Mar. 2013.*

"Jump Rings: Artbeads.com—Jewelry Supplies", @ (http://www.aertbeads.com/jewelry-jump-rings.html), pp. 1-2, Mar. 2013.*

"Unique Uses for Old CDs, eHow.com" (http://www.ehow.com/info_8072371_unique-uses-old-cds.html), pp. 1-3, Mar. 2013.*

"Scarecrows in the Guarden; Today's Homeowner" (http://todatshomeowner/scarecrows-in-theguarden?) pp. 1-10, Mar. 2013.*

"Scarecrow-Bird-Control.com:: Visual Bird Deterrents" (http://www.scarecrow-bird-control.com/visual-bird-deterrents/), pp. 1-3, Mar. 2013.*

* cited by examiner

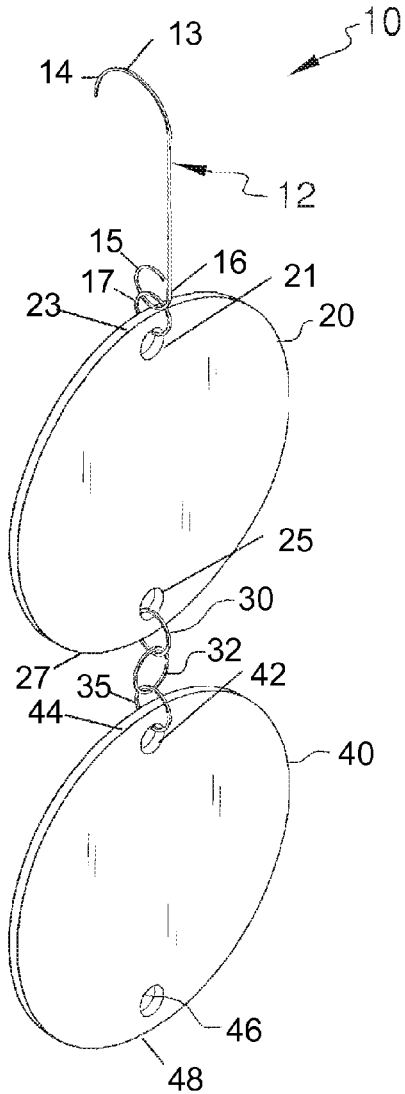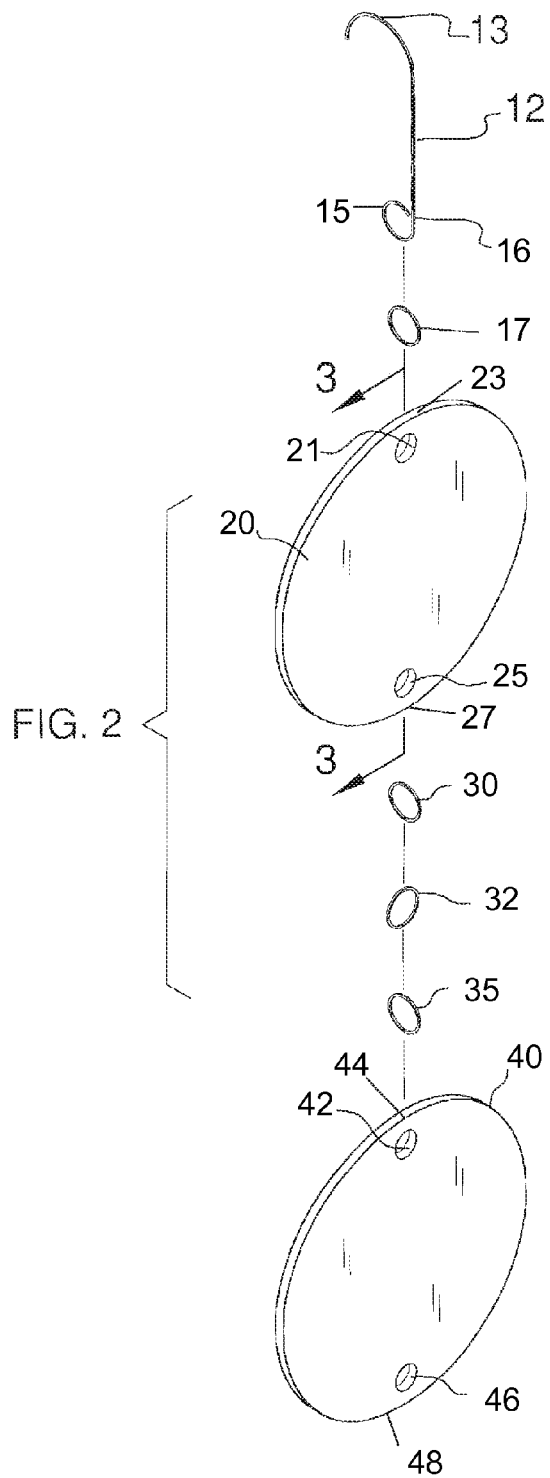
FIG. 1
FIG. 2

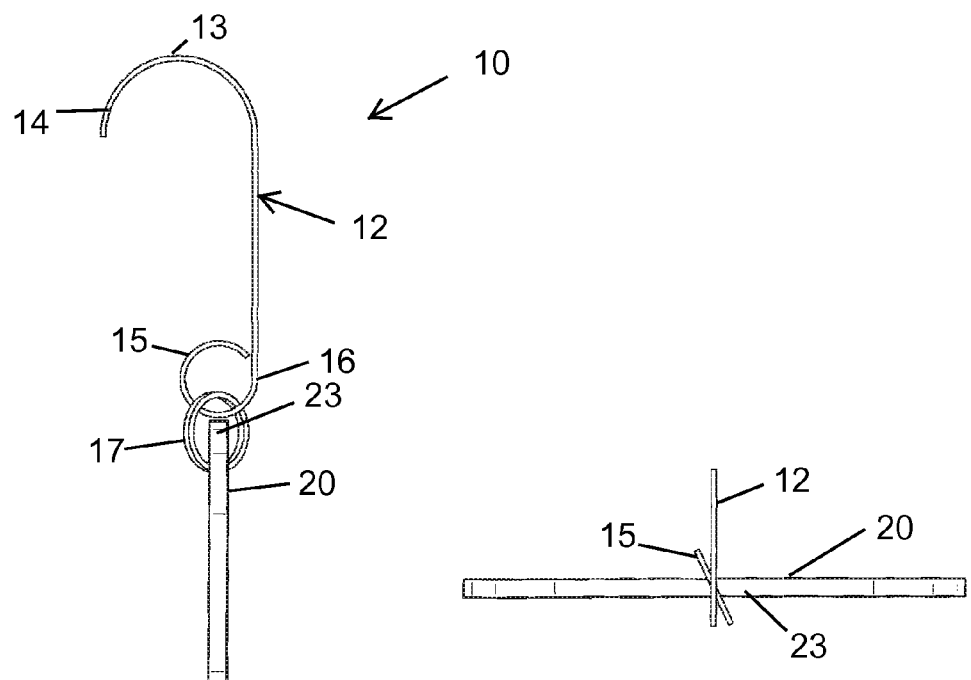
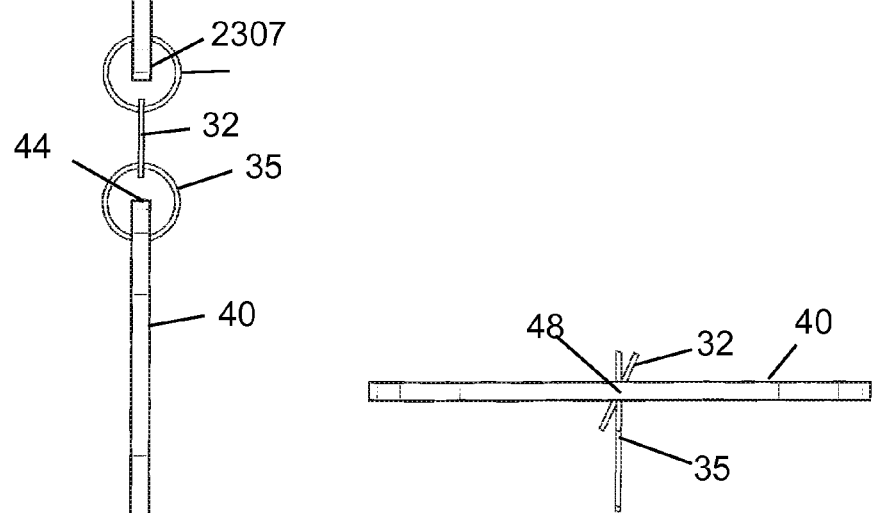

BIRD REPELLING APPARATUS

CROSS-REFERENCE TO RELATED APPLICATIONS

U.S. Nonprovisional Utility patent application Ser. No. 12/122,155 filed May 16, 2008

FEDERALLY SPONSORED RESEARCH OR DEVELOPMENT

Not Applicable

BACKGROUND OF THE INVENTION

It is well known that plants and especially fruits are susceptible to bird attack, which results in destruction and lessened crop harvests. A host of devices have been used in attempt to deter such attacks. Scarecrows, nets, and electrically powered devices are but a few examples. A significant concern in attempting to deter birds and other animals is expense. An added consideration is ease of manufacture. Further, application of any device or devices must be fast and easy in order to be cost effective. Several key factors largely determine usefulness of a device in deterring birds, one being movement, another being light reflection, and another being movement of a specific size of hanging object. The present apparatus provides a basic inexpensive means for deterring birds by light reflection and wind-influenced movement.

FIELD OF THE INVENTION

The present apparatus relates to various scarecrow devices and more especially to a bird repelling apparatus which reflects light and which moves upon receipt of wind thereupon.

SUMMARY OF THE INVENTION

The general purpose of the bird repelling apparatus, described subsequently in greater detail, is to provide a bird repelling apparatus which has many novel features that result in an improved bird repelling apparatus which is not anticipated, rendered obvious, suggested, or even implied by prior art, either alone or in combination thereof.

To attain this, the bird repelling apparatus provides for warding animals and especially birds off of bushes and trees, especially fruit bearing plants, thereby enabling a superior harvest. The design provides for inexpensive manufacture and sale so that use of the apparatus is cost effective. Each apparatus is easily hung onto a plant by a hook end on a hanger to which at least a pair of high gloss finish stainless steel discs are loosely connected in order to achieve liberal, relatively independent and unimpeded movement of the discs in even a slight breeze as well as maximum light reflectiveness to best promote the bird-repelling function of the apparatus. The hook, initial ring, wire rings, and jump ring are rust proof to ensure durability and long life.

Experimentation dictates measurements of the rings which include 0.75 inch diameter memory wire rings and a 0.4 inch diameter jump wire ring, which loosely connects the two memory wire rings. Experimentation also teaches that the repelling function calls for a thin 26 gauge disc having a diameter greater than 3 inches. While only 2 discs are illustrated in combination, the unused orifice at the bottom side of the second disc provides for attachment of more apparatus in tandem or more discs or of other objects, including ornamental decorative accessories.

The discs are ideal for protecting crops, as noted, but also make for ornaments themselves, after crops are harvested for example. Further, the discs are provided in high gloss colors also.

Thus has been broadly outlined the more important features of the improved bird repelling apparatus so that the detailed description thereof that follows may be better understood and in order that the present contribution to the art may be better appreciated.

An object of the bird repelling apparatus is to repel birds and other animals.

Another object of the bird repelling apparatus is to negate damage to food bearing plants.

A further object of the bird repelling apparatus is to use natural light reflection.

An added object of the bird repelling apparatus is to use naturally occurring winds to cause movement.

Still another object of the bird repelling apparatus is to function as an ornament.

Yet another object of the bird repelling apparatus is to be inexpensively made and sold.

These together with additional objects, features and advantages of the improved bird repelling apparatus will be readily apparent to those of ordinary skill in the art upon reading the following detailed description of present improved bird repelling apparatus when taken in conjunction with the accompanying drawings.

BRIEF DESCRIPTION OF THE DRAWINGS

FIG. 1 is a perspective view.
FIG. 2 is an exploded perspective view.
FIG. 6 is a right elevation view, the opposite side being a mirror image of the shown.
FIG. 7 is a top plan view.
FIG. 8 is a bottom plan view.

DETAILED DESCRIPTION OF THE DRAWINGS

With reference now to the drawings, and in particular FIGS. 1 through 8 thereof, the principles and concepts of the bird repelling apparatus generally designated by the reference number 10 will be described.

Figure 3:
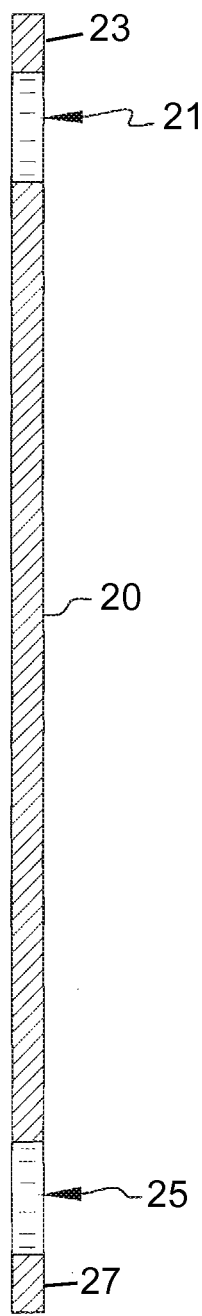
FIG. 3 is a lateral cross sectional view of a disc.
Figure 4:
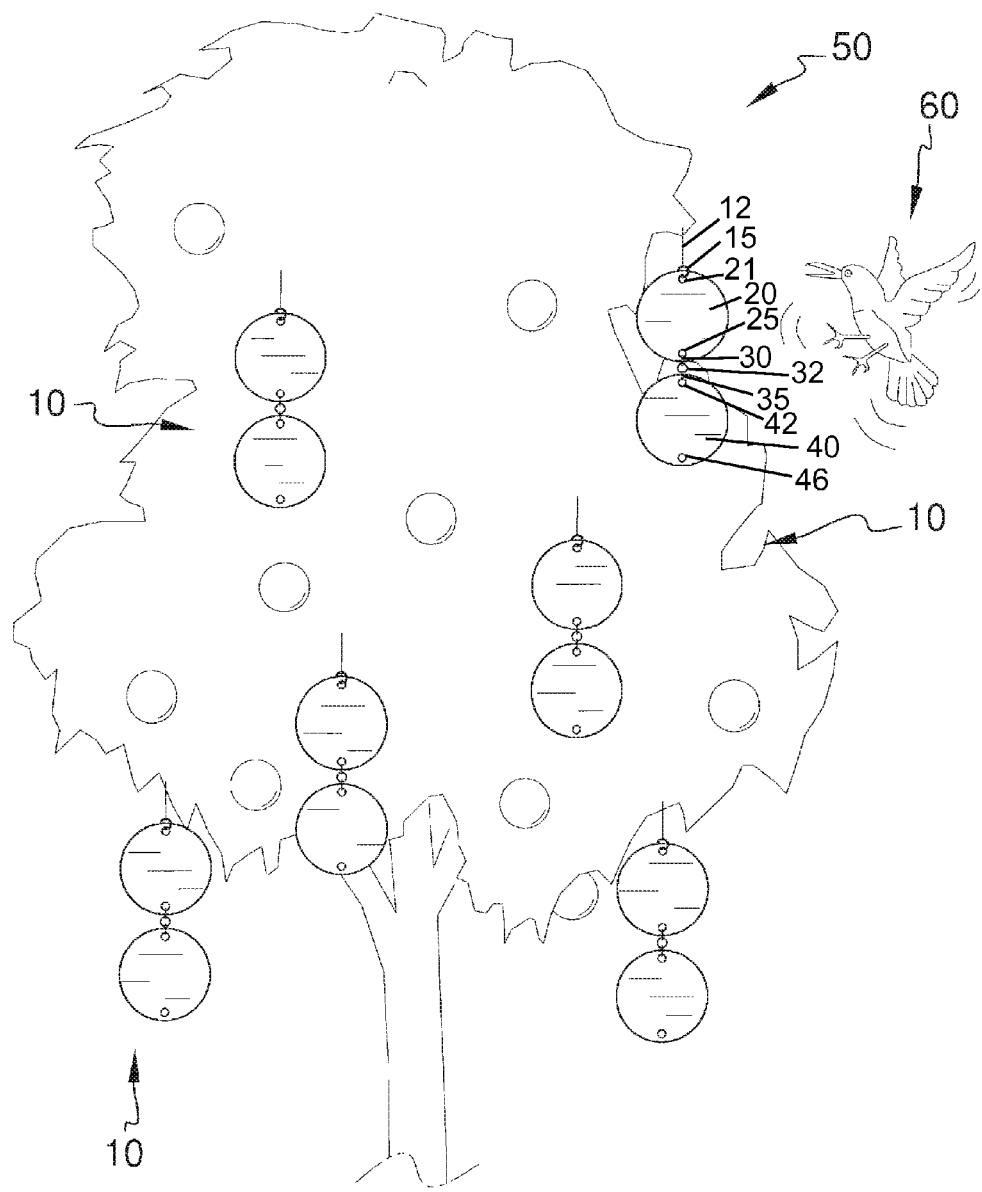
FIG. 4 is an in-use front elevation view of a plurality of the apparatus.
Figure 5:
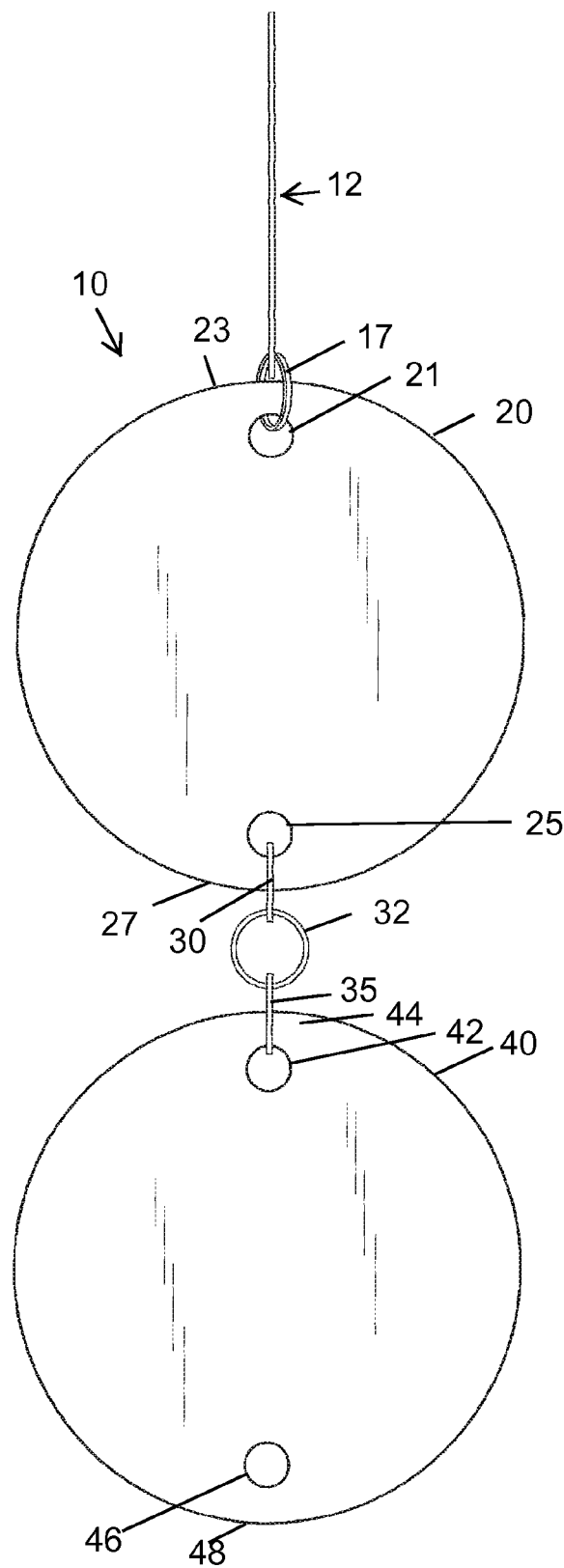
FIG. 5 is a front elevation view, a rear side being a mirror image of the shown.

Referring to FIG. 4 a plurality of the bird repelling apparatus 10 is removably hung from the tree 50. As many apparatus 10 as are deemed necessary to discourage birds 60 away from a tree or other plant. Each apparatus 10 is most effective when hung from a branch which allows free wind-influenced movement of the apparatus 10.

Referring to FIGS. 1 through 8, each apparatus 10 comprises a hanger 12 having a hook 13 disposed at a first end 14 and a round eyelet 15 disposed at an opposite second end 16. The relatively large hook 13 provides for hanging on a branch of acceptable strength. An initial ring 17 is loosely attached to the eyelet 15. The thin first disc 20 has a top aperture 21 disposed proximal to a top end 23 of the first disc 20 and a bottom aperture 25 disposed proximal to a bottom end 27 of the first disc 20. Each of the top aperture 21 and the bottom aperture 25 has a diameter of 0.2 inches. The initial ring 17 loosely engages the top aperture 21 of the first disc 20. The first disc 20 has a diameter greater than 3 inches and a 26 gauge thickness.

A round first memory wire ring 30 loosely engages the bottom aperture 25. The first memory wire ring 30 has a diameter of 0.75 inch. A round jump ring 32 loosely engages the first memory wire ring 30. The jump ring 32 has a diameter of 0.4 inches.

The present apparatus 10 also includes a round second memory wire ring 35 having a same diameter as the first memory wire ring 30. A thin second disc 40 is also provided. The second disc 40 has an upper aperture 42 disposed proximal to an upper end 44 thereof and a lower aperture 32 disposed proximal to a lower end 34 thereof. The second memory wire ring 35 loosely engages both the jump ring 32 and the upper aperture 42 of the second disc 40. The second disc 40 has the same dimensions as the first disc 20. Each of the upper aperture 42 and the lower aperture 46 has a 0.2 inch diameter.

Experimentation reveals that the aforestated dimensions of the first and second discs 20, 40, of the first and second memory wire rings 30, 35, of the jump ring 32, and of the top aperture 21, the bottom aperture 25, the upper aperture 42 and the lower aperture 46 are critical for the bird repelling function of the present apparatus. The diameter of the top aperture 21, the bottom aperture 25, the upper aperture 42 allow the proper loose connection of the initial ring 17 and the first disc 20 to the top aperture 21, of the first memory wire 30 to the bottom aperture 35, and of the second memory wire ring 35 and the second disc 40 to the upper aperture 42. The aforestated dimensions of the first disc 20 and the second disc 40 work the best to frighten a bird away.

The hanger 12, initial ring 17, first and second memory wire rings 30, 35, and jump ring 32 are rust proof to ensure durability and long life. The first disc 20 and the second disc 40 are formed of a high gloss finished stainless steel that is critical to warding birds 60 away from a plant in that a surface formed of a material other than stainless steel, such as wood or plastic, does not have the durability and weight along with the size necessary for the required movement to perform the bird repelling function of the present apparatus 10 and, further, a surface formed of non-glossy or low-gloss material does not repel birds 60 as well as the high gloss finish of the first and second discs 20, 40.

What is claimed is:

1. A bird repelling apparatus for repelling birds from plants, the apparatus comprising:
 a rust-proof hanger having a hook disposed at a first end and a round eyelet disposed at a opposite second end, the hook removably hung on a plant;
 a rust-proof initial ring loosely attached to the eyelet;
 a rust-proof first flat object having an orifice at each of an opposite side, one orifice loosely affixed to the initial ring;
 a thin first disc comprising:
  a top aperture disposed proximal to a top end of the first disc;
  a bottom aperture disposed proximal to a bottom end of the first disc;
  wherein the initial ring loosely engages the top aperture;
 a rust-proof round first memory wire ring loosely engaging the bottom aperture of the first disc;
 a rust-proof round jump ring loosely engaging the first memory wire ring;
 a rust-proof second round memory wire ring loosely affixed to the jump ring;
 a rust-proof thin second disc comprising:
  an upper aperture disposed proximal to an upper end of the second disc;
  a lower aperture disposed proximal to a lower end of the second disc;
 wherein the second memory wire ring loosely engages each of the jump ring and the upper aperture of the second disc;
 wherein the first disc and second disc move upon receipt of wind thereupon;
 wherein wind-influenced movement of the first disc and the second disc repels birds.

2. The bird repelling apparatus of claim 1 wherein each of the first disc and the second disc has a diameter greater than 3 inches and a 26 gauge thickness;
 wherein each of the first memory wire ring and the second memory wire ring have a diameter of 0.75 inch;
 wherein the jump ring has a diameter of 0.4 inches;
 wherein each of the top aperture, the bottom aperture, the upper aperture, and the lower aperture have a 0.2 inch diameter.

3. The bird repelling apparatus of claim 2 wherein each of the first disc and the second disc are formed of high gloss finished stainless steel, wherein light reflection from the high gloss finished stainless steel repels birds.

4. A bird repelling apparatus for repelling birds from plants, the apparatus consisting of:
 a rust-proof hanger having a hook disposed at a first end and a round eyelet disposed at a opposite second end, the hook removably hung on a plant;
 a rust-proof initial ring loosely attached to the eyelet;
 a rust-proof first flat object having an orifice at each of an opposite side, one orifice loosely affixed to the initial ring;
 a thin first disc comprising:
  a top aperture disposed proximal to a top end of the first disc;
  a bottom aperture disposed proximal to a bottom end of the first disc;
  wherein the initial ring loosely engages the top aperture;
 a rust-proof round first memory wire ring loosely engaging the bottom aperture of the first disc;
 a rust-proof round jump ring loosely engaging the first memory wire ring;
 a rust-proof second round memory wire ring loosely affixed to the jump ring;
 a rust-proof thin second disc comprising:
  an upper aperture disposed proximal to an upper end of the second disc;
  a lower aperture disposed proximal to a lower end of the second disc;
 wherein the second memory wire ring loosely engages each of the jump ring and the upper aperture of the second disc;
 wherein the first disc and second disc move upon receipt of wind thereupon;
 wherein wind-influenced movement of the first disc and the second disc repels birds;
 wherein each of the first disc and the second disc has a diameter greater than 3 inches and a 26 gauge thickness;
 wherein each of the first memory wire ring and the second memory wire ring have a diameter of 0.75 inch;
 wherein the jump ring has a diameter of 0.4 inches;
 wherein each of the top aperture, the bottom aperture, the upper aperture, and the lower aperture have a 0.2 inch diameter;
 further wherein each of the first disc and the second disc are formed of high gloss finished stainless steel, wherein light reflection from the high gloss finished stainless steel repels birds.

* * * * *